United States Patent
Claux et al.

(10) Patent No.: US 10,862,840 B2
(45) Date of Patent: Dec. 8, 2020

(54) INLINE MESSAGE COMPOSING WITH VISIBLE LIST VIEW

(71) Applicant: Microsoft Technology Licensing, LLC, Redmond, WA (US)

(72) Inventors: David Pierre Marcel Claux, Redmond, WA (US); Michael Anthony Faoro, North Bend, WA (US); John Leslie Gibbon, Renton, WA (US); Jason Todd Henderson, Tacoma, WA (US); Chao-Chung Lin, Redmond, WA (US); Robert Steven Meyer, Seattle, WA (US); Andrew John Sullivan, Seattle, WA (US); Guojun Yu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/959,526

(22) Filed: Apr. 23, 2018

(65) Prior Publication Data
US 2018/0241710 A1 Aug. 23, 2018

Related U.S. Application Data

(63) Continuation of application No. 14/720,946, filed on May 25, 2015, now Pat. No. 9,954,806, which is a
(Continued)

(51) Int. Cl.
*G06F 15/16* (2006.01)
*H04L 12/58* (2006.01)
(Continued)

(52) U.S. Cl.
CPC ............ *H04L 51/16* (2013.01); *G06F 3/0482* (2013.01); *G06F 3/04842* (2013.01);
(Continued)

(58) Field of Classification Search
CPC ..................................................... G06F 17/212
(Continued)

(56) References Cited

U.S. PATENT DOCUMENTS 7,243,298 B2    7/2007  Yozell-Epstein et al.
7,657,523 B2    2/2010  Ebanks
(Continued)

FOREIGN PATENT DOCUMENTS

CN          1521667 A     8/2004
CN        102355529 A     2/2012
(Continued)

OTHER PUBLICATIONS

Composing and Sending Messages published Sep. 23, 2010 https://sites.google.com/a/georgiasouthern.edu/google-apps-fac-staff/learn-more/gmail/gmail-sig (Year: 2010).*
(Continued)

*Primary Examiner* — Hamza N Algibhah (57) ABSTRACT

A compose form for drafting a message is presented inline within a window along with a message list. For example, instead of overlaying the message application's user interface (UI) with a new window for composing a message, the compose form is displayed within a portion of the window reserved for viewing content of messages. While composing the message using the compose form, the rest of the message application's UI remains visible and accessible to the user. For example, the user may navigate to another folder and/or move to another message/conversation by interacting with the tree view/message list view. A draft of the message being composed may be automatically saved when the user navigates away from the compose form (e.g. by selecting another conversation in the list view).

24 Claims, 9 Drawing Sheets

Related U.S. Application Data continuation of application No. 13/249,065, filed on Sep. 29, 2011, now Pat. No. 9,043,411.

(51) Int. Cl.

| | |
|---|---|
| *G06F 16/957* | (2019.01) |
| *G06F 40/103* | (2020.01) |
| *G06F 40/166* | (2020.01) |
| *G06F 3/0482* | (2013.01) |
| *G06F 3/0484* | (2013.01) |
| *H04L 29/08* | (2006.01) |

(52) U.S. Cl.
CPC ...... *G06F 3/04847* (2013.01); *G06F 16/9577* (2019.01); *G06F 40/103* (2020.01); *G06F 40/166* (2020.01); *H04L 51/00* (2013.01); *H04L 67/02* (2013.01)

(58) Field of Classification Search
USPC .................................................. 709/206
See application file for complete search history.

(56) References Cited

U.S. PATENT DOCUMENTS

| | | | |
|---|---|---|---|
| 7,818,394 | B1 | 10/2010 | Lawler et al. |
| 7,886,000 | B1 | 2/2011 | Polis et al. |
| 7,908,647 | B1 | 3/2011 | Polis et al. |
| 7,925,306 | B2 | 4/2011 | Carmody et al. |
| 7,966,325 | B2 | 6/2011 | Singh |
| 8,108,414 | B2 | 1/2012 | Stackpole |
| 8,150,844 | B2 | 4/2012 | Redstone et al. |
| 9,922,309 | B2 | 3/2018 | Claux et al. |
| 2005/0193067 | A1 | 9/2005 | Ferguson |
| 2007/0143699 | A1 | 6/2007 | Jaeger |
| 2008/0104227 | A1 | 5/2008 | Birnie et al. |
| 2009/0049140 | A1 | 2/2009 | Stoddard et al. |
| 2009/0164923 | A1 | 6/2009 | Ovi |
| 2009/0216843 | A1 | 8/2009 | Milner et al. |
| 2010/0162168 | A1 | 6/2010 | Lee et al. |
| 2011/0035329 | A1 | 2/2011 | Delli santi et al. |
| 2011/0231499 | A1 | 9/2011 | Stovicek et al. |
| 2011/0258559 | A1 | 10/2011 | You et al. |
| 2011/0264655 | A1 | 10/2011 | Xiao et al. |
| 2011/0302162 | A1 | 12/2011 | Xiao et al. |
| 2011/0320423 | A1 | 12/2011 | Gemmell et al. |
| 2012/0023085 | A1 | 1/2012 | Bellerive et al. |
| 2012/0078916 | A1 | 3/2012 | Tseng |
| 2012/0166416 | A1 | 6/2012 | Murdock et al. |
| 2013/0036080 | A1 | 2/2013 | Kane-Esrig |
| 2013/0086175 | A1 | 4/2013 | Claux et al. |

FOREIGN PATENT DOCUMENTS

| | | | |
|---|---|---|---|
| KR | 20060019863 | A | 3/2006 |
| KR | 1020100000753 | A | 1/2010 |
| KR | 20110102938 | A | 9/2011 |

OTHER PUBLICATIONS

Durpal "Prevent accidentally navigating away from pages where content has changed" published Sep. 1, 2005 https://www.drupal.org/project/drupal/issues/30220 (Year: 2005).*

Nowakowski, Maciek, "New in Labs: Preview Pane", Retrieved from: https://gmail.googleblog.com/2011/08/new-in-labs-preview-pane.html, Aug. 4, 2011, 3 Pages.

"Office Action Issued in Korean Patent Application No. 10-2014-7032904", dated Dec. 19, 2018, 12 Pages.

How to Use email on the BlackBerry PlayBook, Retrieved from https://www.knowyourmobile.com/blackberry/12372/how-use-email-blackberry-playbook, Feb. 24, 2011, 8 Pages.

RIM BlackBerry Bold 9000 review 1 of 2—Design, Keyboard, Email, Retrieved from https://www.youtube.com/watch?v=R0V5i6ujHf4, Nov. 2, 2008, 3 Pages.

Tsuchida, Yoneichi, "Talented Pocket+ Gmail", Published by Impress Japan, First Edition, Sep. 21, 2009, 7 Pages.

"Gmail Draft Email", Retrieved From https://www.youtube.com/watch?v=i3kFLiMbEsY, Apr. 27, 2012, 1 Page.

"International Search Report and Written Opinion Issued in PCT Application No. PCT/US2013/041481", dated Jul. 16, 2014, 12 Pages.

Hara, Yukihiro, "More Convenient Utilization of Gmail~ From Basics to Applications", in Nikkei Personal Computer, Published by Nikkei BP, Apr. 5, 2012, 3 Pages.

"Final Office Action Issued in U.S. Appl. No. 13/617,755", dated Jun. 16, 2016, 14 Pages.

"Final Office Action Issued in U.S. Appl. No. 13/617,755", dated Apr. 17, 2015, 15 Pages.

"Non-Final Office Action Issued in U.S. Appl. No. 13/617,755", dated Nov. 17, 2015, 14 Pages.

"Non-Final Office Action Issued in U.S. Appl. No. 13/617,755", dated Oct. 7, 2014, 13 Pages.

"Non-Final Office Action Issued in U.S. Appl. No. 13/617,755", dated Jun. 2, 2017, 13 Pages.

"Office Action Issued in European Patent Application No. 13726949.4", dated Aug. 1, 2016, 6 Pages.

Yamaji, et al., "Gmail Super Business Skills", Published by Kiminari Takahira, First Edition, Jun. 8, 2009, 3 Pages.

"Summon to Attend Oral Hearing Proceedings Issued in European Patent Application No. 13726949.4", Mailed Date: Mar. 10, 2017, 7 Pages.

"Supplementary Search Report Issued in European Patent Application No. 13726949.4", dated Nov. 24, 2015, 6 Pages.

Cornwell, Jason, "A Preview of Gmail's New Look", Retrieved From http://gmailblog.blogspot.in/2011/06/preview-of-gmails-new-look.html, Jun. 30, 2011, 6 Pages.

"Office Action Issued in Japanese Patent Application No. 2015-514066", dated May 26, 2017, 11 Pages.

"Office Action Issued in Japanese Patent Application No. 2015-514066", dated Jan. 22, 2018, 6 pages.

"Second Office Action Issued in Chinese Patent Application No. 201380027401.X", dated Jul. 5, 2017, 9 Pages.

"First Office Action and Search Report Issued in Chinese Patent Application No. 201380027401.X", dated Oct. 9, 2016, 16 Pages.

"Office Action Issued in Chinese Patent Application No. 201380027401.X", dated Jan. 2, 2018, 6 Pages.

Sharp, Phil, "Introducing the new compose in Gmail", Retrieved From: https://gmail.googleblog.com/2012/10/introducing-new-compose-in-gmail.html, Oct. 30, 2012, 4 Pages.

"Quick Save plugin for SquirrelMail", Retrieved From: https://bugs.debian.org/cgi-bin/bugreport.cgi?bug=468964 , Mar. 2, 2008, 3 Pages.

"Gmail to roll out new inbox sorting options", Retrieved From: https://thenextweb.com/google/2011/07/08/google-to-roll-out-new-inbox-sorting-options/ ,Jul. 8, 2011, 3 Pages.

"Final Office Action Issued in Korean Patent Application No. 10-2014-7032904", dated Jun. 20, 2019, 6 Pages.

"Office Action Issued in Korean Patent Application No. 10-2014-7032904", dated Aug. 12, 2019, 6 Pages.

* cited by examiner

INLINE MESSAGE COMPOSING WITH VISIBLE LIST VIEW

CROSS-REFERENCE TO RELATED APPLICATIONS

This application is a continuation of U.S. patent application Ser. No. 14/720,946, filed May 25, 2015, entitled INLINE MESSAGE COMPOSING WITH VISIBLE LIST VIEW, now U.S. Pat. No. 9,954,806, which is a continuation of U.S. patent application Ser. No. 13/249,065, filed Sep. 29, 2011, entitled INLINE MESSAGE COMPOSING WITH VISIBLE LIST VIEW, and now assigned U.S. Pat. No. 9,043,411, which are hereby incorporated by reference in their entirety.

BACKGROUND

Users routinely compose messages to other users. For example, a user may create a new message, respond to a received message, or forward a message. When composing a message, users of an email client are moved to another screen and lose the context in which they previously were working.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A compose form for drafting a message is presented inline within a window along with a message list. For example, instead of overlaying the message application's user interface (UI) with a new window for composing a message, the compose form is displayed within a portion of the window reserved for viewing content of messages. While composing the message using the compose form, the rest of the message application's UI remains visible and accessible to the user. For example, the user may navigate to another folder and/or move to another message/conversation by interacting with the tree view/message list view. A draft of the message being composed may be automatically saved when the user navigates away from the compose form (e.g. by selecting another conversation in the list view).

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used; wherein tasks are performed by remote processing devices that are linked through a communications network. In a distributed computing environment, program modules may be located in both local and remote memory storage devices.

Figure 1:
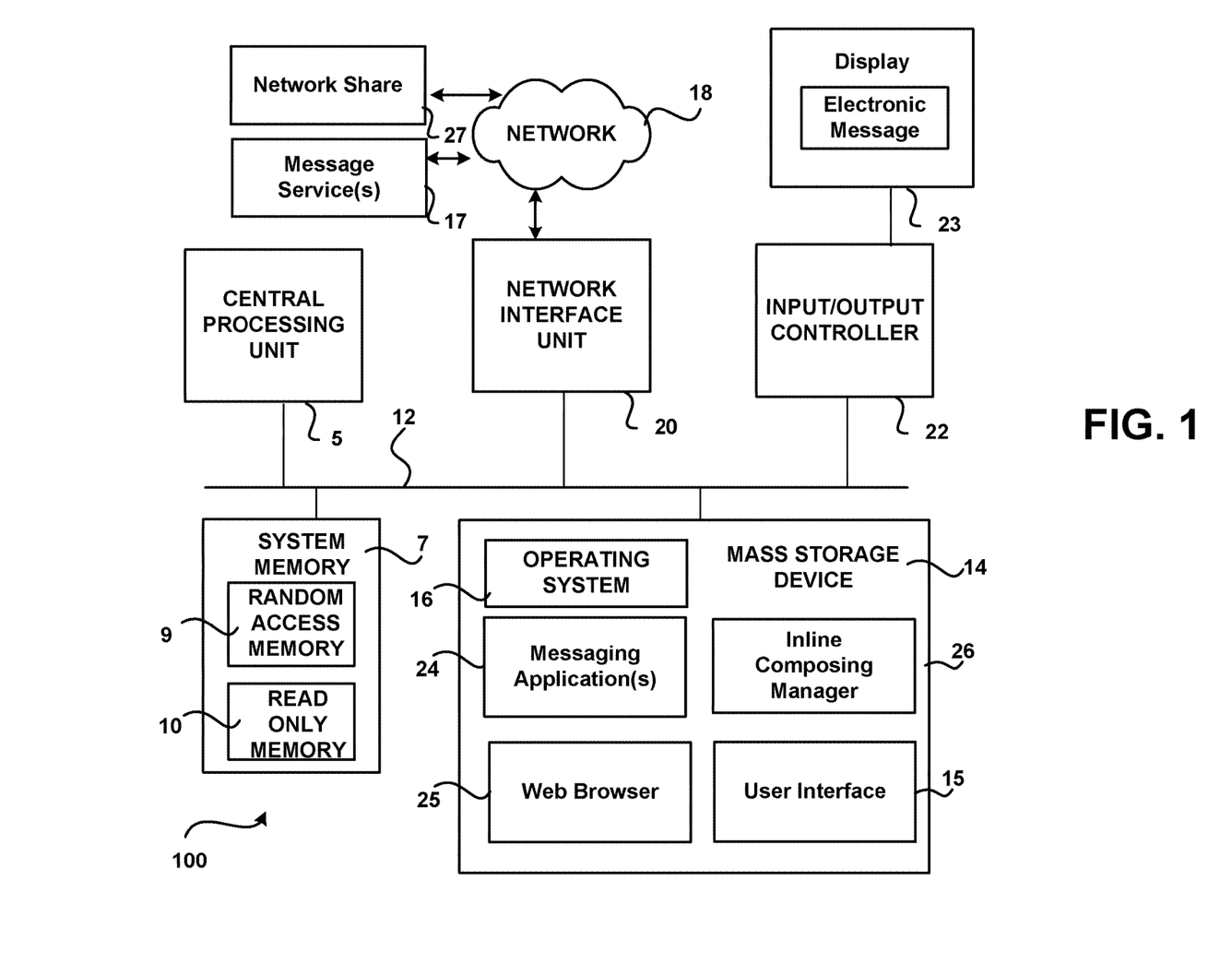
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, netbook, laptop), a server, a desktop, or some other type of computing device and includes a central processing unit 5 ("CPU"), a system memory 7, including a random access memory 9 ("RAM") and a read-only memory ("ROM") 10, and a system bus 12 that couples the system memory 7 to the central processing unit ("CPU") 5.

A basic input/output system containing the basic routines that help to transfer information between elements within the computer 100, such as during startup, is stored in the ROM 10. The computer 100 further includes a mass storage device 14 for storing an operating system 16, messaging application(s) 24, Web Browser 25, and inline composing manager 26, which will be described in greater detail below.

The mass storage device 14 is connected to the CPU 5 through a mass storage controller (not shown) connected to the system bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the system bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, a mouse, a touch input device, or an electronic stylus (not shown in FIG. 1). Similarly, an input/output controller 22 may provide input/output to a display screen 23, a printer, or other type of output device.

A touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a computer 100, such as the WINDOWS PHONE 7®, WINDOWS 7®, or WINDOWS SERVER® operating systems from MICROSOFT CORPORATION of Redmond, Wash. The mass storage device 14 and RAM 9 may also store one or more program modules. In particular, the mass storage device 14 and the RAM 9 may store one or more application programs, including one or more messaging application(s) 24 and Web browser 25.

A user interface 15 is used by a user to interact with applications and messages. Messaging application(s) 24 may be one or more different messaging applications. For example, computer 100 may include an email application, an Instant Messaging (IM) application, an SMS application, an MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE® or some other network based email and messaging service.

Network share 27 is configured to store content (e.g. documents, spreadsheets, messages, Web content, and the like) that are accessible to one or more users through network 18. For example, network share 27 may store content that is accessible by users located at one or more locations. Electronic messages may access/reference content within network share 27.

Inline composing manager 26 is configured to display a composing form inline with a display of a message list within a window for composing an electronic message. Inline composing manager 26 may be located externally from an application, e.g. messaging application 24, as shown or may be a part of an application. Further, all/some of the functionality provided by inline composing manager 26 may be located internally/externally from a messaging application. More details regarding the inline composing manager are disclosed below.

Figure 2:
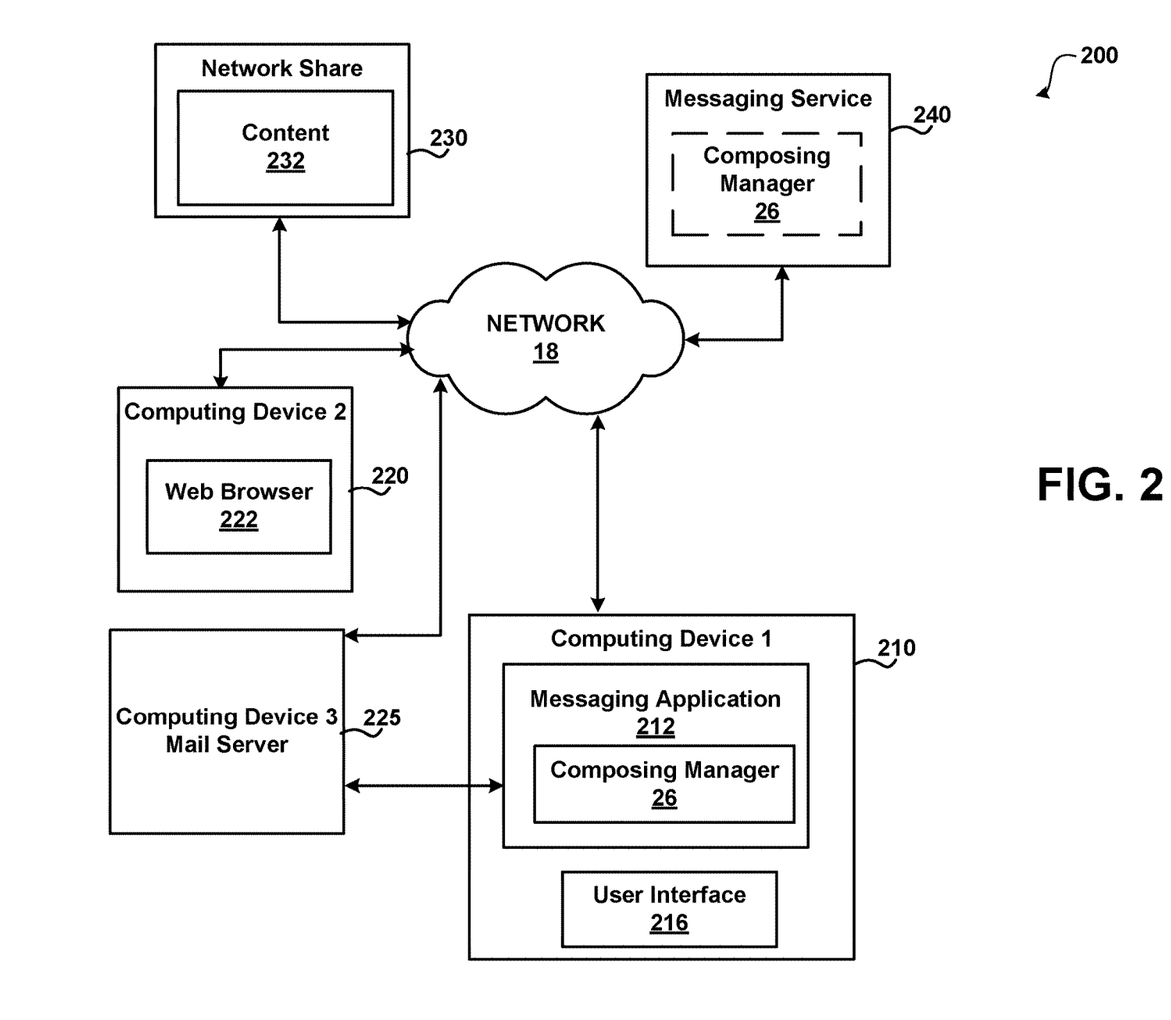
FIG. 2 shows a system for composing a message using an inline composing form.

FIG. 2 shows a system for composing a message using an inline composing form. As illustrated, system 200 includes computing device 1 (210), computing device 2 (220), computing device 3 (225), network share 230 and messaging service 240.

The computing devices may be any type of computing device that is configured to perform the operations relating to composing, sending and receiving electronic messages. For example, some of the computing devices may be: mobile computing devices (e.g. cellular phones, tablets, smart phones, laptops, and the like), desktop computing devices and servers. Some computing devices may be arranged to provide an online service (e.g. messaging service 240 that is configured for composing, sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1 (210), computing device 2 (220), computing device 3 (225), network share 230 and messaging service 240.

Computing device 1 (210) includes messaging application 212 and user interface 216. As illustrated, computing device 1 (210) is used by a user to interact with electronic messages, content in a network share (e.g. content 232) and the like.

User interface (UI) 216 is used to interact with an application and content, such as messaging application 212 and content 232. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily compose and interact with content and electronic messages. For example, a user may simply select an option within UI 216 that creates an inline composing form within a window to draft a new electronic message that may/may not include one or more links to content. The term "link" refers to an address that represents a location of content. For example, a link may be in the form of a Uniform Resource Locator (URL) that specifies a network location of where the content is stored. Selecting the link generally retrieves the content that is pointed to by the link.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 (210) and computing device 2 (220). Messaging service 240 may be configured to process different message types, such as SMS, MMS, email, messages for social networks and the like. Messaging service 240 may be configured with functionality of inline composing manager 26 and one or more message types may be used to communicate the electronic messages.

Computing device 2 (220) includes one or more applications, such as a web browser (222) that may be configured to access a messaging service 240, such as a web based email service and to compose messages and interact with content. For example, a web browser may be used to access an electronic message through an email service and then compose a new message that is displayed inline within a window that also displays a list view of messages.

One or more network shares (e.g. Network share 230) may be used to store content. The content 232 may be any type of content such as word processing documents, spreadsheets, slides, website content and the like. The content 232 may/may not be included (e.g. linked/attached) to an electronic message). Network share 230 is accessible by the computing devices that interact with the content 232. The network share may be associated with an online service that supports online access/interaction with content 232.

Computing device 3 (225) is configured as a mail server. For example, messaging application 212 on computing device 1 (210) may be used to compose a message that is sent to one or more recipients. When the user sends the message, computing device 3 (225) may be configured to perform various mail processing actions and to deliver the message to the one or more recipients.

Inline composing manager 26 is configured to provide functionality for displaying and interacting with a compose form that is displayed inline and used for drafting a message. The compose form is presented inline within a window along with a list display of other messages. For example, instead of overlaying the message application's user interface (UI) with a separate new window for composing a message, the compose form is displayed within a portion of the window reserved for viewing content of messages. While composing the message using the compose form, the rest of the message application's UI remains visible and accessible to the user. For example, the user may navigate to another folder and/or move to another message/conversation by interacting with the tree view/list view. A draft of the message being composed may be automatically saved when the user navigates away from the compose form (e.g. by selecting another conversation in the list view).

Figure 3:
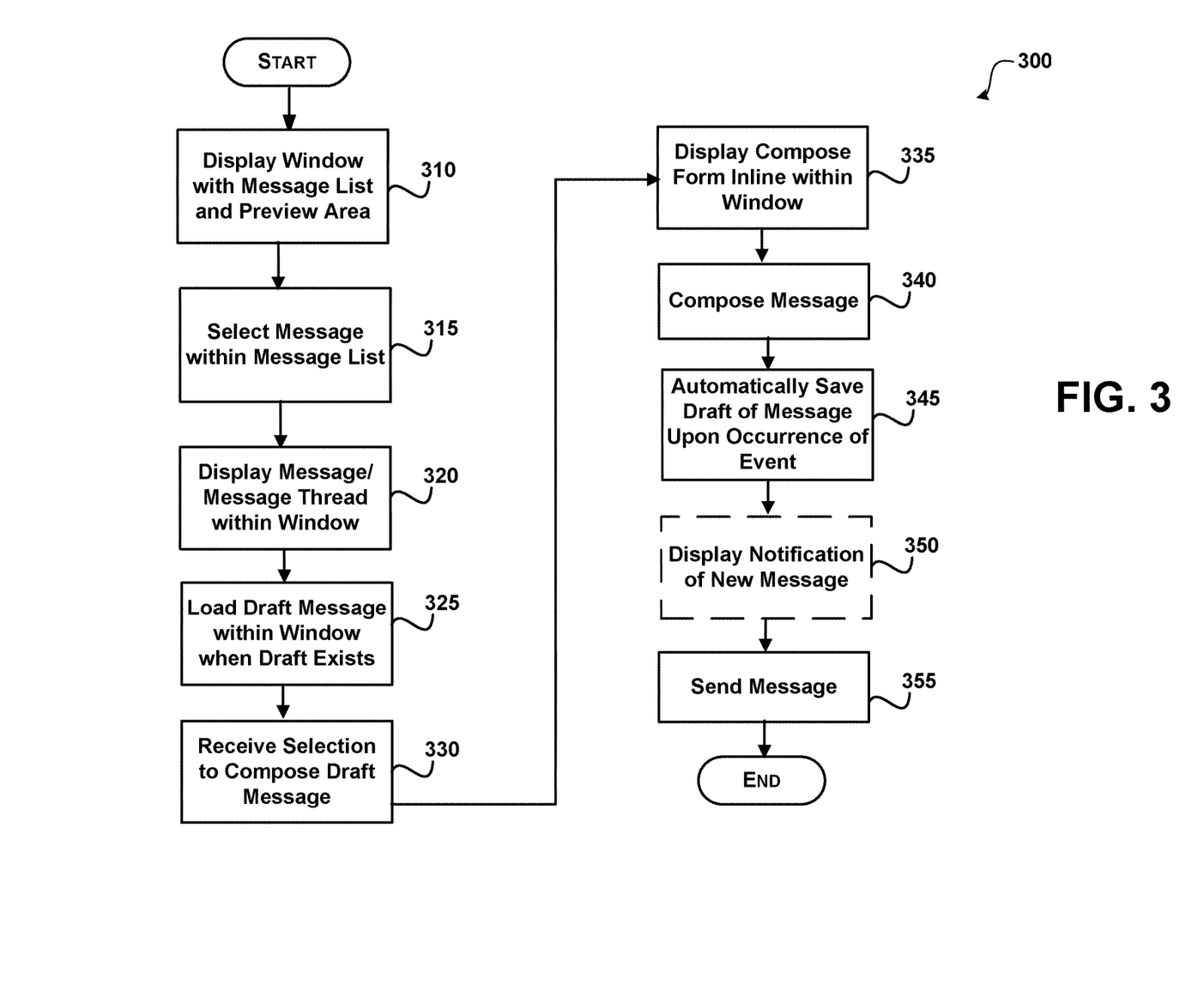
FIG. 3 shows an illustrative process for displaying and interacting with a compose form that is displayed inline with a message list.

FIG. 3 shows an illustrative process for displaying and interacting with a compose form that is displayed inline with a message list. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 300 moves to operation 310, where a graphical window is displayed that includes a display of a message list including electronic messages and a preview area that displays content obtained from one or more of the messages that are contained within the list of electronic messages. Other information/panes may be displayed within the window. For example, a folder tree, calendar view, task view, contact view, social network view, formatting options and other menu options may be displayed within the window. According to an embodiment, the preview area is a reading pane that displays the selected message and any other messages that are within the thread of the message.

Flowing to operation 315, a message/message thread is selected within the display of the list of messages within the window. For example, the user may use a mouse input/touch input to select the message. Other selection methods may also be used.

Moving to operation 320, the selected message/message thread is displayed within the preview area. For example, in response to selecting a message the content of the message and any other messages in the thread (when a thread is selected) is displayed within the preview area. One or more selectable compose options are also displayed for composing a new message. According to an embodiment, the selectable compose options comprise one or more of: a reply option, a reply all option, a forward option and a new option. The compose options may be displayed in different locations. For example, the compose options may be shown near the top of the display of options. The compose options may also be shown in response to a user moving a pointing device near a message. For example, when the user moves the pointing device over a message within the message thread, the selectable compose options may be displayed using an alpha blend such that the user can still see the message content that is underneath the display of the selectable compose options.

Transitioning to operation 325, a draft message that was previously saved is automatically loaded when a draft message already exists. For example, a user may have previously started to draft a message and then navigated away from the message (see operation 350).

Flowing to operation 330, a selection to compose a draft message is received. According to an embodiment, the user selects one of the compose options that is displayed within the preview area of the window. When a draft message already exists when the message/message thread is selected, an option may be displayed requesting the user to select an option to proceed with editing of the saved draft message (See FIG. 6).

Moving to operation 335, the compose form for creating/editing a message is displayed inline within the window that is also used to display the list of messages. According to an embodiment, the compose form that is displayed comprises fields for addressing, editing, formatting and sending the message (See FIGURES below for example compose forms). One or more animations may also be performed to illustrate that the originally selected message transforms from a read-only message to an editable draft message. For example, the animation may appear to transform the draft message such that the user has added confidence that the reply, reply all or forward action is being performed on the correct message.

Transitioning to operation 340, the message is composed within the compose form.

Flowing to operation 345, a draft of the message is automatically saved upon the occurrence of an event. The event may be many different types of event. For example, the event may be an expiration of a timer (e.g. the draft is saved every 1, 2, 5 minutes and the like) and/or some other event. According to an embodiment, the draft is saved when the user navigates away from the currently selected message. For example, a user may select another message within the message list.

Moving to operation 350, a notification may be displayed to the user that is composing the draft message indicating that a new electronic message is received that is related to the message/message thread.

Flowing to operation 355, the message is sent. The message is sent in response to receiving a selection to send the message composed within the compose form.

The process then flows to an end block and returns to processing other actions.

FIGS. 4-9 show exemplary windows for composing electronic messages using an inline compose form. FIGS. 4-9 are for exemplary purposes and are not intended to be limiting.

Figure 4:
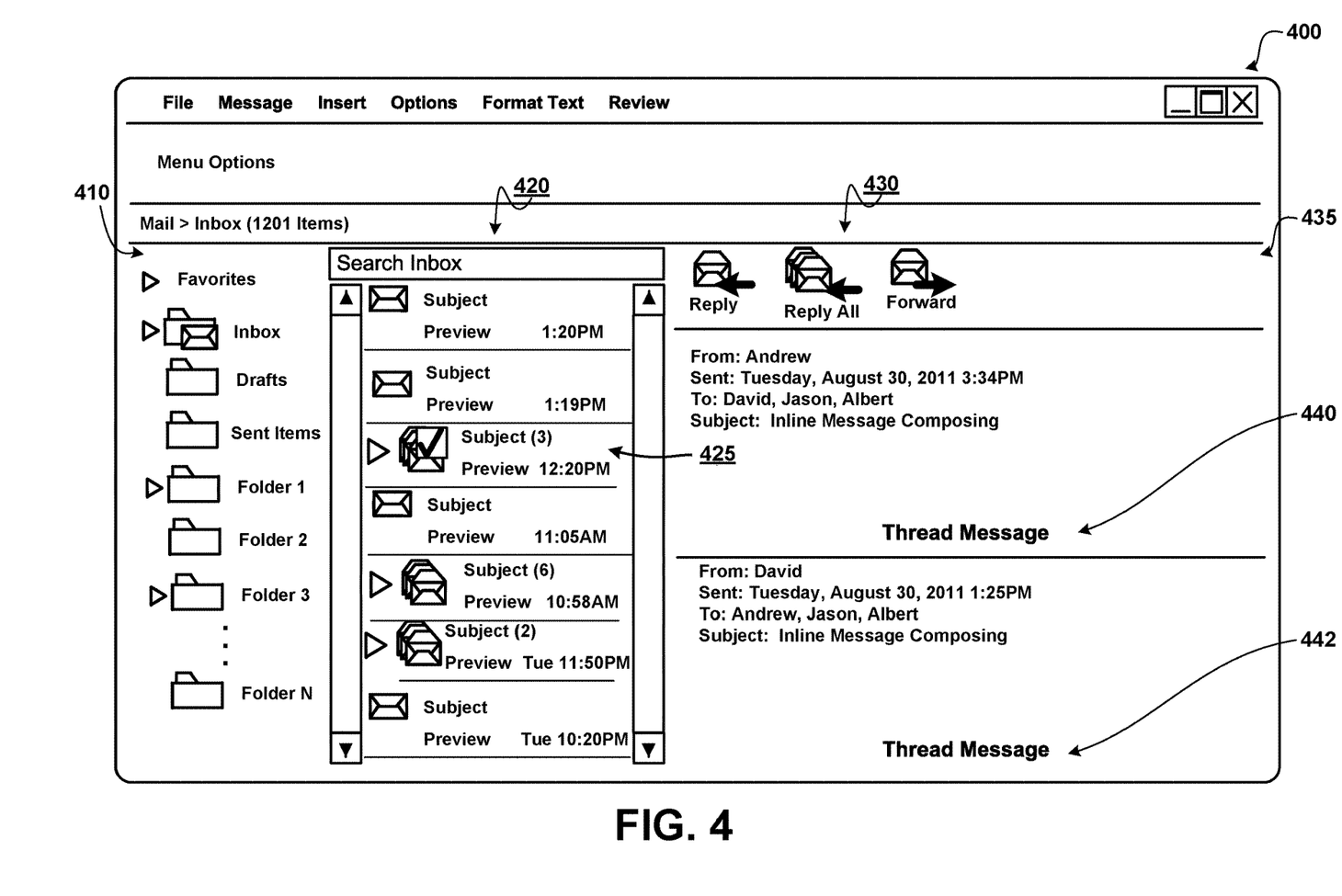
FIG. 4 shows a display of messaging window that includes an option used to display an inline compose form.

FIG. 4 shows a display of messaging window that includes an option used to display an inline compose form. As illustrated, window 400 includes a folder list 410, a message list 420 and a preview area 430. More or fewer areas may be included within window 400. Window 400 may be a window that is associated with a desktop application, a mobile application and/or a web-based application (e.g. displayed by a browser). For example, a web browser may access an electronic mail service, an email application on a computing device may be configured to compose/send/receive emails from one or more different services, and the like.

Folder list 410 shows different folders that may be selected to populate message list 420. For example, the Inbox folder may be selected to show the messages currently in the user's inbox. When a folder contains additional folders, an arrow indicator is displayed that may be used to expand/compress the display of the folders.

Message list 420 shows the messages that are contained within the selected folder from folder list 410. The messages illustrated within message list 420 may be arranged in different manners. For example, the messages may be arranged by date, thread, sender, size, subject, attachments, importance, to: categories, type, flag(s), and the like. As illustrated, the messages in message list 420 are displayed by date and conversation. Message list 420 shows single messages and message threads. The messages in a message thread may be expanded by selecting the expand/collapse icon before the message thread.

Preview area 430 shows message content that is associated with a selected message/message thread. A graphical indicator, such as an icon and/or coloring/highlighting, may be displayed to indicate a selected message (e.g. a check mark shown to indicate message thread 425 is selected). As illustrated, preview area shows two (440, 442) of the three messages within message thread 425. Preview area 430 also shows compose options 435. Compose options 435 are used to start composing a new message. According to an embodiment, the compose options 435, comprise a reply option, a reply all option, and a forward option.

Figure 5:
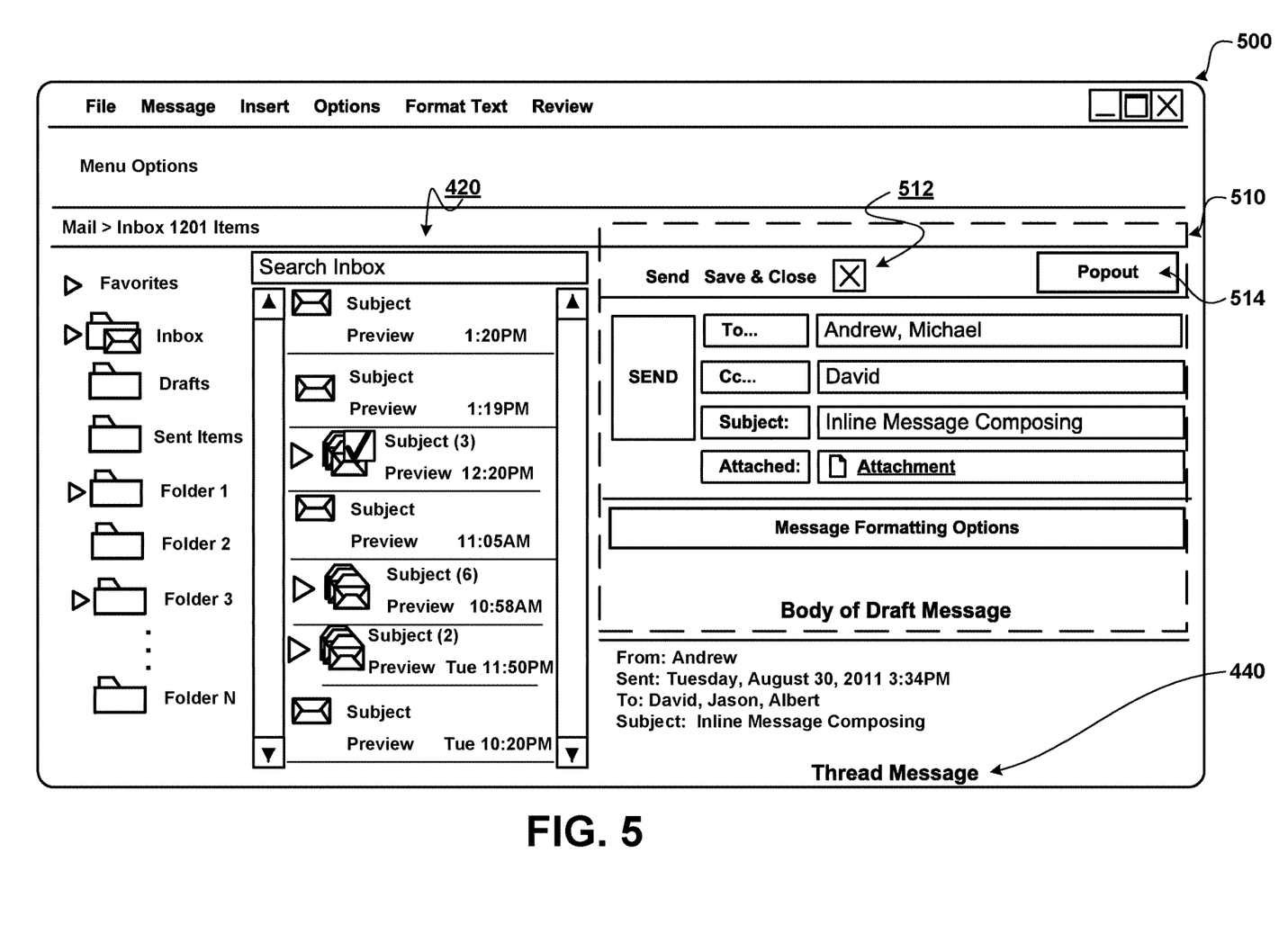
FIG. 5 shows a display of messaging window that includes a compose form that is displayed inline within the preview area.

FIG. 5 shows a display of messaging window that includes a compose form that is displayed inline within the preview area.

The messaging window 500 of FIG. 5 is similar to the messaging window 400 of FIG. 4. As illustrated, messaging window 500 includes compose form 510 that is displayed inline within messaging window 500 in response to a selection of a compose option, such as a compose option displayed within compose options 435 as shown in FIG. 4.

As illustrated, compose form 510 comprises a send option, a save and close option, a close option 512, a pop-out option 514, message addressing options (e.g. To . . . , Cc . . . ), subject option, attachment option, message formatting options and an edit area to compose the body of the draft message 630. The space used to display thread message 440 is used to display the compose option 510. Message formatting options may display various options for formatting the message. According to an embodiment, a contextual ribbon is displayed that includes functionality used when composing a message.

More or fewer options may be displayed within the compose form 510. For example, the addressing options/subject/attachment options may be collapsed. According to an embodiment, a user may select the options that they would like displayed within the compose form 510.

While the draft message is being composed, a user may add messages from message list 420 as attachments. For example, a user may drag and drop a message as an attachment, use a gesture to attach the message, and the like. Displaying the message list 420 within the same window as the draft message alleviates the user from having to switch between application windows, using copy/paste operations, and/or using a file chooser dialog.

In response to pop-out option 514, the compose form 510 is displayed within a new window and the display of the preview area would return to displaying the message content.

Figure 6:
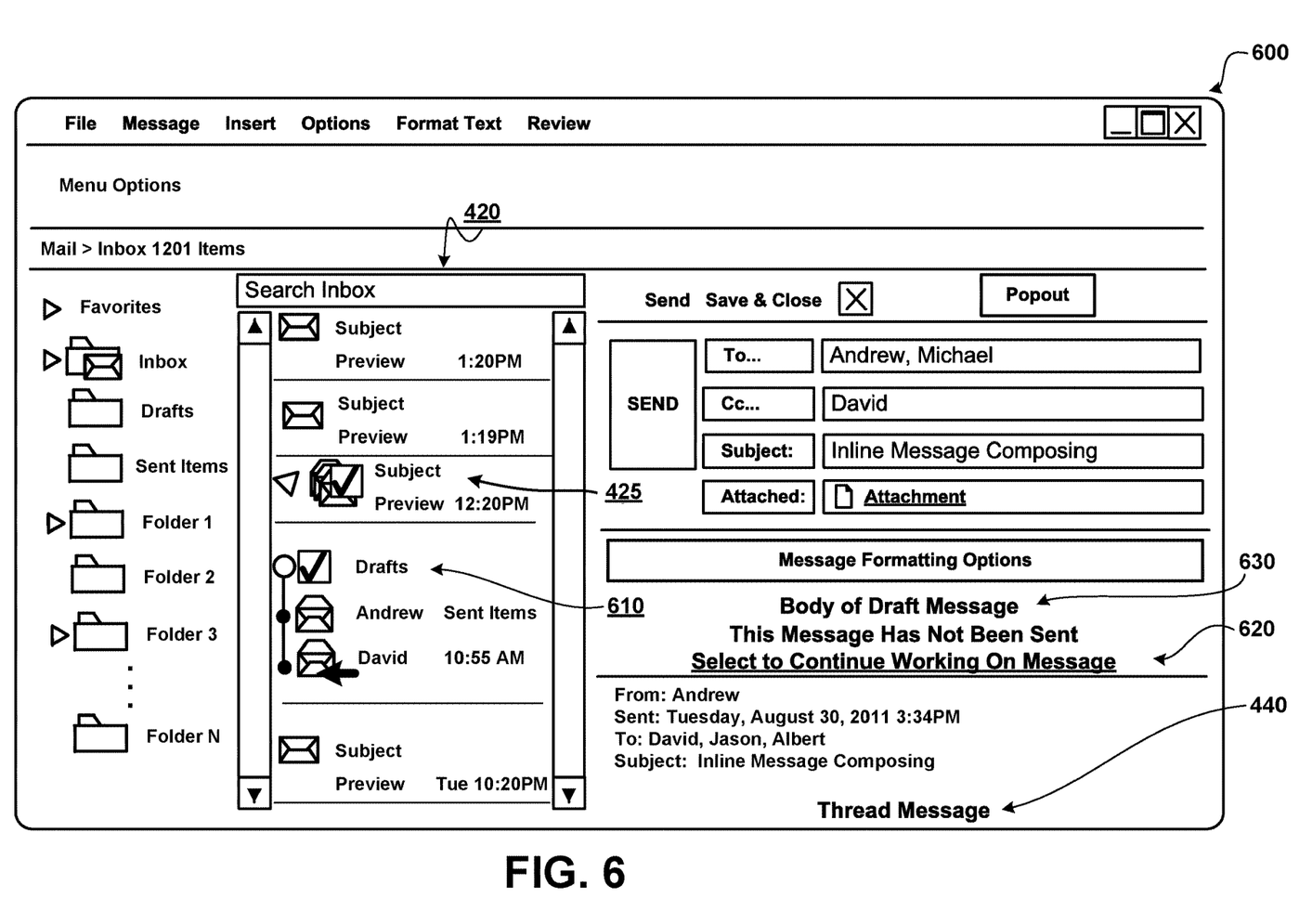
FIG. 6 shows a display of a messaging window that includes a compose form including a previously saved draft that has not been sent.

FIG. 6 shows a display of messaging window that includes a compose form including a previously saved draft that has not been sent.

The messaging window 600 of FIG. 6 is similar to the messaging window 500 of FIG. 5. As illustrated, messaging window 600 shows a draft of a message that has been saved and reloaded within the compose form but has not been sent yet. Message list 420 shows an expanded view 610 of message thread 425. According to an embodiment, message thread 425 includes a space for the draft message that is currently displayed within the compose form. A user may select the draft message at any point to return to editing the draft message. Alternatively/additionally, a user may be provided with a notification 620 that the current draft message has not been sent. According to an embodiment, when the user selects the "Select to Continue Working on Message" link, the user is returned to the editing experience as described herein (e.g. See FIG. 5).

Figure 7:
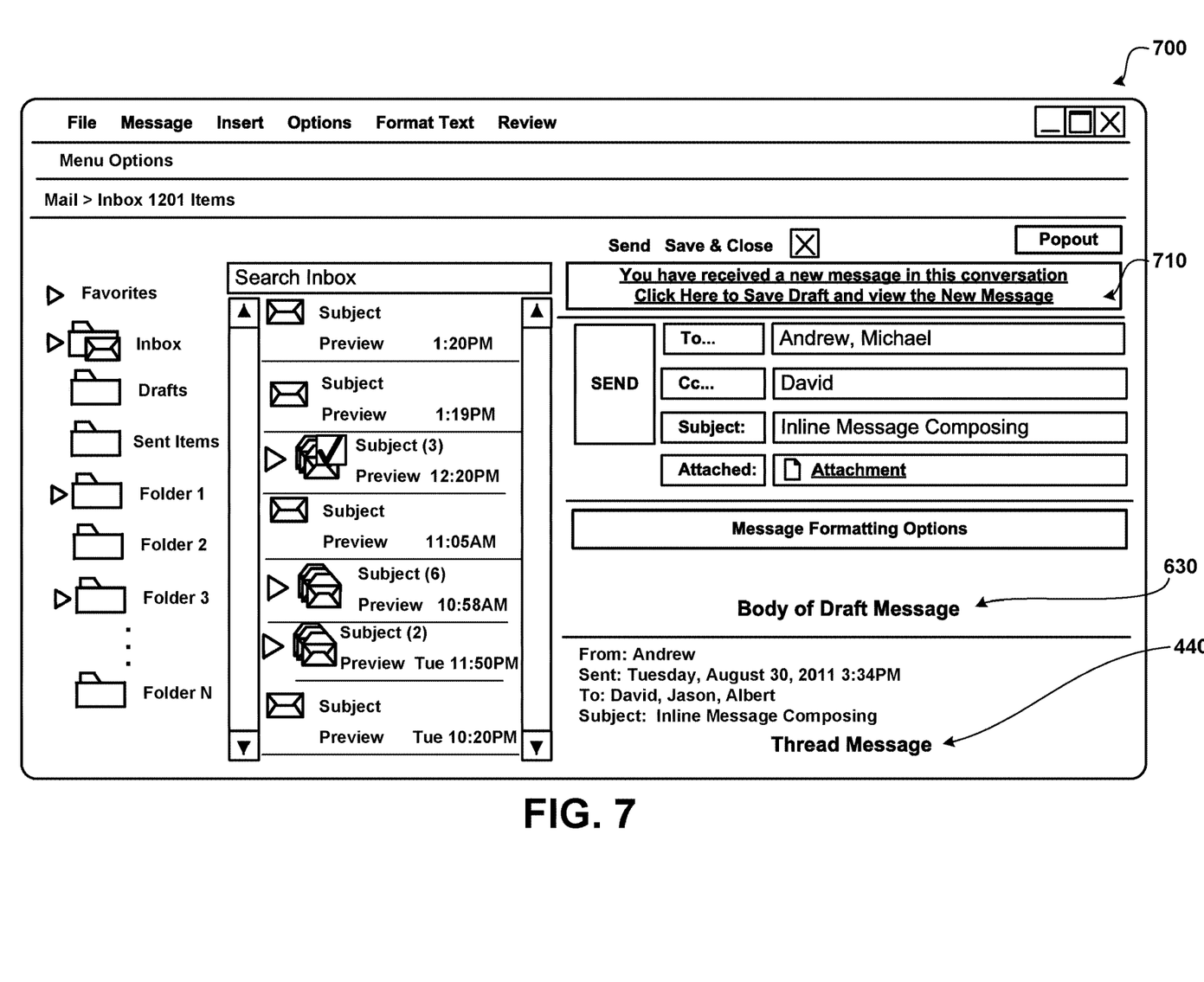
FIG. 7 shows a display of a messaging window that includes a notification that a new message has been received in the conversation while the user is composing a draft.

FIG. 7 shows a display of messaging window that includes a notification that a new message has been received in the conversation while the user is composing a draft.

The messaging window 700 of FIG. 7 is similar to the messaging window 600 of FIG. 6. When composing a message using the compose form, new items may be received that are related to the same conversation. It is therefore possible that the message currently being composed isn't responding to the latest mail in the thread. Notification 710 displays a notification that informs the user of the new item. According to an embodiment, when notification 710 is selected, the draft message is saved and the view is updated within the message list and preview area to display the new item within the message thread.

Figure 8:
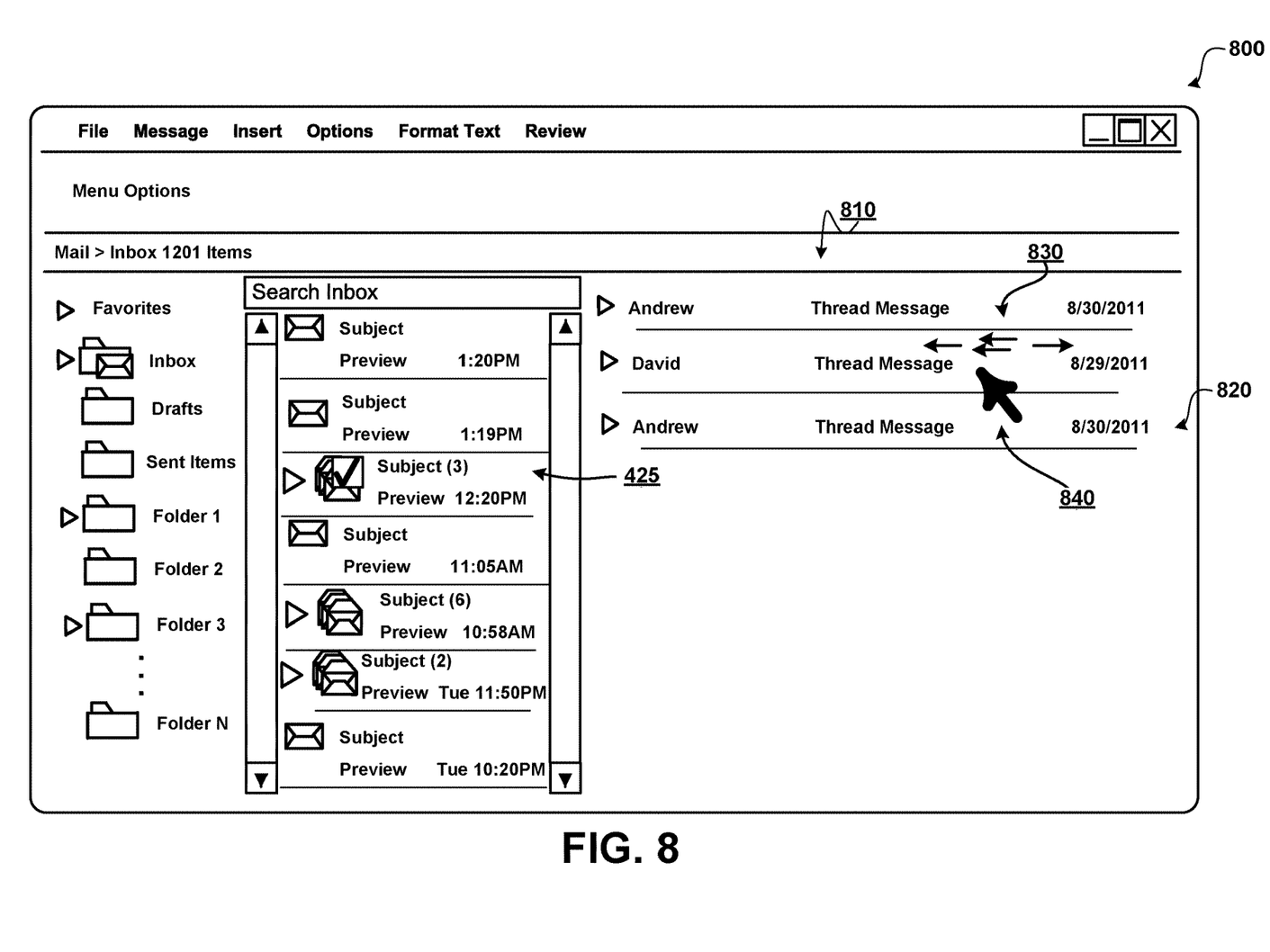
FIG. 8 shows a messaging window that includes a preview area that illustrated selecting a compose option.

FIG. 8 shows a messaging window that includes a preview area that illustrated selecting a compose option.

As illustrated, preview area 810 shows a list of messages from a selected message thread 425. Compose options 830 are displayed in response to moving to a message within the preview area 820. For example, compose options 830 may be displayed in response to a cursor 840 moving to a message. The compose options 830 may be displayed alpha blended before selection, such that other content below the display of the compose options 830 may also be seen by the user.

Figure 9:
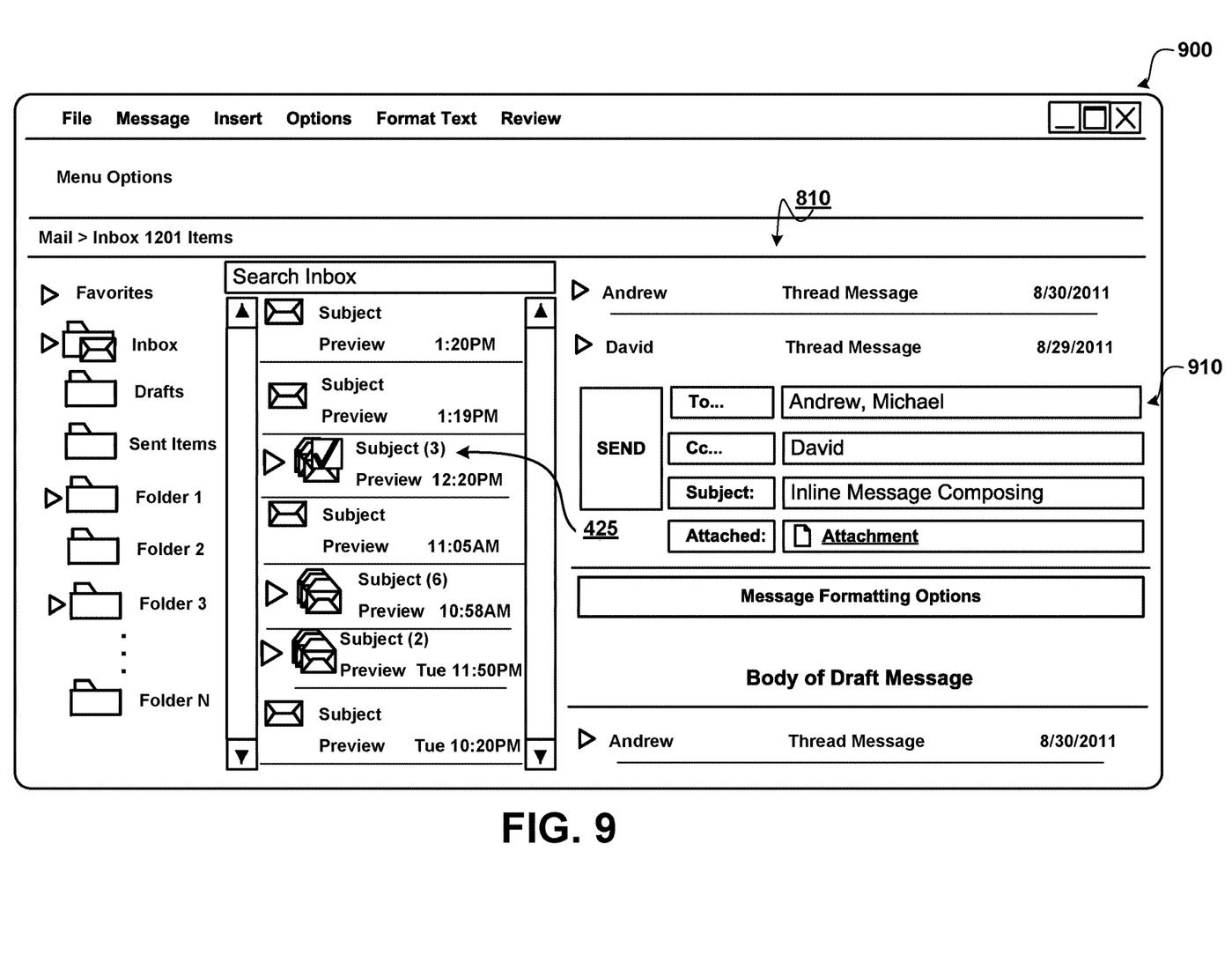
FIG. 9 shows a messaging window that includes a preview area that includes an inline compose form.

FIG. 9 shows a messaging window that includes a preview area that includes an inline compose form.

The messaging window 900 of FIG. 9 is similar to the messaging window 800 of FIG. 8.

As illustrated, preview area 810 shows a list of messages from a selected message thread 425. Compose form 910 is displayed in response to selecting a compose option, such as one of the compose options 830 illustrated in FIG. 8.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
    displaying a first area including a message list including a list of messages;
    displaying adjacent to and concurrently with the first area, a second area including a display of message content from a selected message from the list of messages;
    displaying adjacent to and concurrently with the first area, a third area including a display of a selectable folder list including a drafts folder;
    displaying, in the second area, content from a selected message;
    displaying, in the second area, an option to reply to the selected message;
    receiving a selection of the option to reply to the selected message;
    in response to receiving the selection, displaying a compose form to compose a draft reply message;
    receiving input data for a body of the draft message into the compose form;
    receiving a selection to navigate away from the compose form, wherein the selection to navigate away from the compose form is a selection of another message in the message list;
    automatically saving the input data as a portion of the draft reply message; and
    displaying, concurrently with the list of messages, a draft message indicator in the first area with the selected message indicating the draft reply message has been saved, wherein the draft message indicator is positioned to indicate that the draft reply message is a reply to the selected message.

2. The method of claim 1, wherein the second area further comprises a forward option.

3. The method of claim 1, wherein the compose form is displayed within the second area.

4. The method of claim 1, wherein the display of content from the selected message includes a display of a message thread including a plurality of messages including the selected message.

5. The method of claim 1, wherein displaying the draft message indicator includes displaying the draft message indicator in an expanded view of a thread for the selected message.

6. The method of claim 1, further comprising displaying a link to the draft message in the second area concurrently with the content from the selected message.

7. The method of claim 1, wherein the draft message indicator is displayed adjacent the selected message.

8. The method of claim 1, further comprising:
    receiving, after receiving the selection to navigate away from the compose form, a subsequent selection of the selected message; and
    in response to receiving the subsequent selection of the selected message, displaying the input data saved as the portion of the draft reply message.

9. A computer-readable storage device storing computer-executable instructions configured to perform operations comprising:
    displaying a message list, the message list including a first message and a second message;
    receiving a selection of the first message in the message list;
    displaying concurrently with the message list, a preview area including a display of message content from the first message;
    receiving a selection of a reply option to reply to the first message;
    in response to receiving the selection of the reply option, displaying a compose form to compose a draft reply message;
    receiving input data for a body of the draft message into the compose form;
    receiving a selection to navigate away from the compose form;
    upon receiving the selection to navigate away from the compose form, automatically saving the input data as a portion of the draft reply message;
    displaying, in an expanded view of a thread for the first message, a draft message indicator in the message list indicating the draft reply message has been saved, wherein the draft message indicator is positioned to indicate that the draft reply message is a reply to the first message;
    receiving a selection of the second message from the message list;
    in response to receiving the selection of the second message, displaying content from the selected second message in the preview area;
    receiving a subsequent selection of the first message from the message list;
    in response to receiving the subsequent selection of the first message, displaying, in the preview area, content from the first message and a selectable link to continue working on the saved draft reply message;

receiving a selection of the selectable link; and in response to receiving the selection of the selectable link, displaying the compose form with the input data saved as the portion of the draft reply message.

10. The computer-readable storage device of claim 9, wherein the operations further comprise displaying the reply option in the preview area.

11. The computer-readable storage device of claim 9, wherein the compose form is displayed in the preview area.

12. The computer-readable storage device of claim 9, wherein the message list and the preview area are displayed in a user interface of a messaging application stored in the computer-readable storage device.

13. The computer-readable storage device of claim 9, wherein the operations further comprise displaying selectable folder lists including an inbox folder.

14. A computing system for providing inline message composing, comprising:

at least one processor;

a memory including storing computer-executable instructions, which when executed by the processor perform a set of operations comprising:

displaying a first area including a message list including a list of message threads, the list of message threads including a first message thread, a second message thread, and a third message thread;

displaying adjacent to and concurrently with the first area, a second area including a display of message content from a selected message thread from the list of message threads;

displaying adjacent to and concurrently with the first area, a third area including a display of a selectable folder list including a drafts folder;

receiving a selection of the first message thread;

displaying, in the second area, content from the selected first message thread;

displaying, in the second area, an option to reply to the selected first message thread;

receiving a selection of the option to reply to the selected first message thread;

in response to receiving the selection, displaying a first compose form to compose a first draft reply message;

receiving input data for a body of the first draft reply message into the first compose form;

receiving a selection to navigate away from the first compose form, wherein the selection to navigate away from the first compose form is a selection of the second message thread;

automatically saving the input data as a portion of the first draft reply message;

displaying a first draft message indicator, in the first area, indicating the first draft reply message has been saved, wherein the first draft message indicator is positioned to indicate that the first draft reply message is associated with the first message thread;

based on the selection of the second message thread, displaying, in the second area, content from the second message thread and an option to reply to the second message thread;

receiving a selection of the option to reply to the second message thread;

in response to receiving the selection to reply to the second message thread, displaying a second compose form to compose a second draft reply message;

receiving input data for a body of the second draft reply message into the second compose form;

receiving a selection to navigate away from the second compose form, wherein the selection to navigate away from the compose form is a selection of the third message thread;

automatically saving the input data as a portion of the second draft reply message; and displaying a second draft message indicator, in the first area concurrently with the first draft indicator, indicating the second draft reply message has been saved, wherein the second draft message indicator is positioned to indicate that the second draft reply message is associated with the second message thread.

15. The computing system of claim 14, wherein the first draft message indicator is displayed in an expanded view of a thread for the selected first message thread.

16. The computing system of claim 14, wherein the first compose form is displayed in the second area.

17. The computing system of claim 16, wherein displaying the first compose form includes displaying the first compose form concurrently with content from the selected first message thread.

18. The computing system of claim 14, wherein the first area, second area, and third area are displayed in a user interface of a messaging application stored in the memory of the system.

19. The computing system of claim 14, wherein the operations further comprise:

displaying a selectable link to continue working on the saved first draft reply message;

receiving a selection of the selectable link; and in response to receiving the selection of the selectable link, displaying the first compose form with the input data saved as the portion of the first draft reply message.

20. The computing system of claim 14, wherein displaying content from the selected first message thread includes displaying a plurality of messages.

21. The computing system of claim 14, wherein the operations further comprise, in response to opening the selected first message thread, automatically determining when a draft exists for the selected message that has not been sent.

22. The computing system of claim 14, wherein the operations further comprise receiving a selection of a send option in the first compose form and, in response to receiving the selection of the send option, sending the first draft reply message.

23. The computing system of claim 14, wherein the first draft message indicator is displayed adjacent to the first message thread and the second draft message indicator is displayed adjacent to the second message thread.

24. The computing system of claim 14, wherein the operations further comprise:

receiving, after receiving the selection to navigate away from the first compose form, a subsequent selection of the first message thread; and in response to receiving the subsequent selection of the first message thread, displaying the input data saved as the portion of the first draft reply message.

* * * * *